¹

3,350,387
POLY-N-ALKYLATED NEOMYCINS, KANAMYCINS AND PAROMOMYCINS
Hubert Vanderhaeghe, Winksele, Belgium, assignor to Recherche et Industrie Therapeutiques, R.I.T., Genval, Belgium, a corporation of Belgium
No Drawing. Filed July 12, 1966, Ser. No. 564,537
Claims priority, application Great Britain, Apr. 3, 1962, 12,790/62; Oct. 15, 1962, 38,953/62
7 Claims. (Cl. 260—210)

ABSTRACT OF THE DISCLOSURE

Poly-N-lower alkyl derivatives of neomycin, kanamycin or paromomycin prepared by N-alkylation of the parent antibiotics by chemical methods known to the art. The poly-N-lower alkyl antibiotic compounds have hypocholesterolemic activity.

---

This application is a continuation-in-part of Ser. No. 267,835, filed Mar. 25, 1963, now U.S. Patent No. 3,282,783, issued Nov. 1, 1966.

This invention pertains to new organic compounds demonstrating hypocholesterolemic properties. In particular, this invention relates to alkylated derivatives of polyamino antibiotics of the class consisting of the neomycins, kanamycins and paromomycins.

The above antibiotics are characterized by the presence of one or more aminocycloalcohol group and one or more aminosugar group. For example, the antibiotic neomycin A (also named neamine) is composed of a neosamine C moiety and a deoxystreptamine moiety:

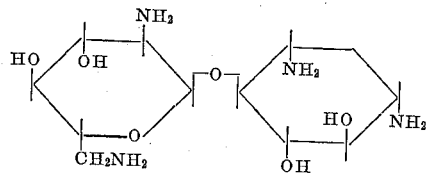

(I)

Similarly, neomycin C (II) is composed of neamine, ribose and neosamine C while neomycin B (III) comprises neamine, ribose and neosamine B.

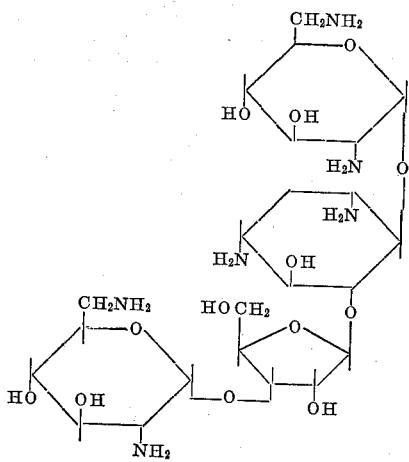

(II)

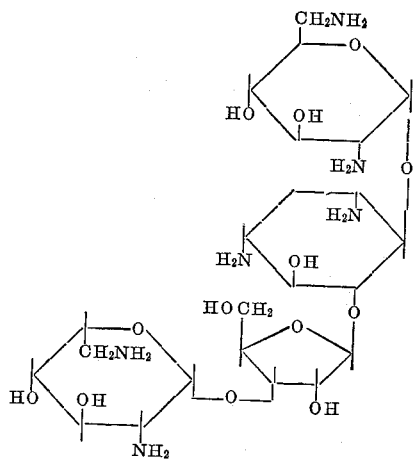

(III)

The compounds of the present invention are derivatives of the above antibiotics wherein at least two and preferably the majority of the amino groups have been alkylated. The resulting compounds are substantially devoid of antibiotic properties by virtue of this alkylation. Surprisingly however, these alkylated products are hypocholesterolemic agents demonstrating the ability to normalize serum and tissue lipid levels.

By the term "alkylation," is meant the introduction of one or more alkyl groups having the formula:

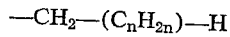

wherein $n$ may have a value of 0 to 5 inclusively. Also embraced are the simple substituted alkyl groups:

wherein R includes phenyl and substituted phenyl, e.g., hydroxyphenyl, (lower)alkylphenyl, (lower)alkoxyphenyl, trifluoromethylphenyl and aminophenyl, including mono and di(lower)alkylaminophenyl. When $n$ has a value of 1 to 5, the group R may also constitute such common substituents as hydroxy, (lower)alkoxy, aryloxy, trifluoromethyl and amino. While such substituents may thus be employed, the invention will be typified herein by straight or branched alkyl groups, i.e., R is hydrogen. Of these alkyl groups, methyl is preferred.

The introduction of the alkyl groups is accomplished by reductive alkylation. The reductive alkylation entails treating the particular antibiotic with a carbonyl compound such as an aldehyde or ketone, in the presence of a source of hydrogen atom. An aldehyde of the structure:

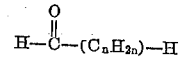

is preferred in view of its greater reactivity. The hydrogen atom source may be either nascent hydrogen (as from a metal acid combination) or more preferably gaseous hydrogen in the presence of a catalyst. Palladium, platinum oxide and nickel are examples of suitable catalysts, but other ones known to the art may conveniently be used. Water is a suitable solvent, more preferably used with an acid, e.g., acetic acid, for solubilizing the amine completely. Other solvents are also suitable.

Alternatively the reductive alkylation may be performed by utilization of the Leuckart reaction employing excesses of the particular aldehyde and formic acid or a functional equivalent thereof as the source of hydrogen atoms with the concurrent formation of carbon dioxide.

It can be seen that by utilization of such reductive alkylation procedures, one or two alkyl groups may be introduced into each primary amino group. While conditions may obviously be limited so that less than all of the available amino groups of the aminosugars and aminoalcohols are alkylated, it is preferred to employ an excess of reagent whereby the antibiotic is exhaustively alkylated. For example, neamine upon exhaustive alkylation contains the theoretically eight methyl groups, thus yielding a compound of the formula:

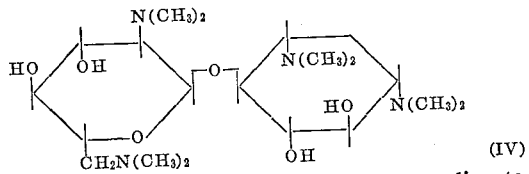

(IV)

These N-alkylated compounds prepared according to the present invention are easily transformed into corresponding quaternary ammonium salts, using methods well known to the art. This reaction is preferably carried out at room temperature in an inert solvent such as acetonitrile for instance. The quaternary ammonium salts and their preparation are comprised in the scope of the present invention.

Examples of such pharmaceutically acceptable quaternary ammonium salts are the chloro, bromo or iodo-methylate and the corresponding ethylate, the chloro, and bromobenzylate or allylate and the like.

Examples of pharmaceutically acceptable addition salts which may likewise be formed include the hydrochloride, sulfate, phosphate, maleate, fumarate, succinate, tartrate, oxalate, citrate, methanesulfonate, ethanesulfonate and the like.

The minimum daily dose for the effective reduction of lipid levels is about 1 g. (as weight of base) for an animal of 75 kg. with the preferred doses comprised between 2 and 20 g. Higher doses can however be safely administered since it appears that the compounds are not substantially absorbed, the mechanism of action presumably being through a reduced absorption of lipid materials from the gastrointestinal tract.

The compounds of the present invention are administered orally using any pharmaceutical form known to the art for such administration. Examples of pharmaceutical forms are powders, capsules, tablets, syrups, sustained release forms and the like, the capsule form being preferred in practice.

The following examples will serve to further illustrate the present invention, they should not however constitute a limitation thereof.

Example 1

Neamine (7.1 g.) is slowly added into a mixture of 1 g. of formic acid (98%) and 2.5 ml. of water. There is then added a mixture of 15 g. of 35% formaldehyde solution and 19 g. of formic acid (98%) and the mixture is refluxed for 3 hours. Hydrochloric acid (2 ml.) is then added and the medium is evaporated under reduced pressure to one half of its volume. Another 4 ml. portion of hydrochloric acid in 5 ml. of water is added and the medium is concentrated under reduced pressure up to getting a gel. This residue is taken up with a solution of 6 ml. of hydrochloric acid in 25 ml. of water and the obtained solution is evaporated to dryness. This residue is taken up with water and the obtained solution is evaporated to dryness. The residue is triturated with a small volume of absolute ethanol and, by addition of ether, 11.55 g. of N-octamethyl neamine hydrochloride is obtained.

The obtained product is dissolved in 400 ml. of water (carbon dioxide-free) and the solution is poured onto a column of 120 ml. of Dowex 2–X8 resin. Elution is carried out with 2 l. of water. The eluate is evaporated to dryness and the residue is taken up with absolute ethanol which is thereafter evaporated. The residue is dissolved in hot acetone and, by cooling, 4.63 g. of N-octamethyl neamine is obtained, M.P. 202–204° C., $[\alpha]_D^{23}=+91°$ ($\pm 1$) (c.=1 in water), $[\alpha]_D^{23}=+98°$ ($\pm 1$) (c.=1 in 2 N sulfuric acid).

This product is devoid of the antibiotic activity of the starting neamine against *Escherichia coli* and *Micrococcus pyogenes* var. *aureus* (ATCC 6538P).

When N-octamethyl neamine is examined by ascending paper chromatography on Schleicher & Schüll No. 2043 (paper washed with acid) in the system n-propanol/acetic acid/pyridine/water 9:1:1:10 followed by detection with ninhydrin, a blue-violet spot with $R_f=0.60$ ($\pm 0.03$) is obtained. Under the same conditions, the starting neamine gives a violet-brown spot with $Rf=0.42$ ($\pm 0.03$).

The O-tetraacetyl-N-octamethyl neamine is obtained as follows: N-octamethyl neamine (3.10 g.) is dissolved in 180 ml. of acetic anhydride and this solution is maintained for 4 days at room temperature. The medium is then evaporated to dryness and the residue is dissolved in 25 ml. of benzene which is thereafter evaporated. The residue is extracted with two portions of 100 ml. of petroleum ether (eb. 40–60° C.). By cooling of the solution, O-tetraacetyl-N-octamethyl neamine separates, $[\alpha]_D^{23}=+70°$ ($\pm 1$) (c.=1 in absolute ethanol), M.P. 144–146° C.

Example 2

Water (180 ml.) and 23 g. of 35% formaldehyde solution are poured into an hydrogenation vessel and 9 g. of neamine sulfate is dissolved in the mixture. Platinum oxide (600 mg.) is then added and the medium is shaken for 5½ hours under hydrogen pressure of 2 kg. per square centimeter. After that reaction time, the residual hydrogen is eliminated and the catalyst is removed by filtration. Platinum oxide (600 mg.) is again added and the medium is shaken overnight under hydrogen pressure of 2 kg. per square centimeter. The residual hydrogen is then eliminated, the catalyst is removed by filtration and the solvent is evaporated under reduced pressure.

The residue is covered with absolute ethanol. After triturating, a suspension is obtained and the precipitate is filtered and dried to yield 10 g. of N-octamethyl neamine sulfate, M.P. (dec.) ca. 225 to 235° C., $[\alpha]_D^{23}=+60°$ ($\pm 1$) (c.=1 in water) and $[\alpha]_D^{23}=+60°$ ($\pm 1$) (c.=1 in normal sulfuric acid).

After passage on a column of Dowex 2–X8 resin as indicated in Example 1, N-octamethyl neamine is obtained, M.P. 204–206° C. (unchanged after addition of the product obtained in Example 1), $[\alpha]_D^{23}=91.5°$ ($\pm 1$) (c.=1 in water).

Example 3

Acetic acid (15 ml.) is poured into an hydrogenation vessel and neamine (0.300 g.) is dissolved therein. Platinum oxide (50 mg.) and 5 ml. of 30% formaldehyde solution are added and the mixture is shaken for 3 hours under hydrogen pressure of 3 kg. per square centimeter.

After that reaction time, the residual hydrogen is eliminated, the catalyst is removed by filtration and the solvent is evaporated under reduced pressure.

The residue is taken up with 15 ml. of normal hydrochloric acid and the obtained solution is concentrated under reduced pressure up to a small volume. By addition of absolute ethanol, N-octamethyl neamine hydrochloride is obtained. This product exhibits the same characteristics as those of the product obtained in Example 1.

Example 4

N-octamethyl neamine (3 g.) obtained in Example 1 is dissolved in 850 ml. of acetonitrile and 32 g. of methyl iodide is added thereto at room temperature. Crystals separate gradually. After standing during one week, the medium is filtered, the crystals are washed with methylene chloride to yield 3.9 g. of N-octamethyl neamine methiodide, M.P. (dec.) ca. 210–220° C.

Example 5

Acetic acid (60 ml.) is poured into an hydrogenation vessel and 2.4 g. of commercial neomycin—i.e. a mixture of neomycin B and some neomycin C—is dissolved therein. There are then added to this solution 250 mg. of platinum oxide and 5 ml. of 30% formaldehyde solution. The mixture is shaken for 3 hours under hydrogen pressure of 3 kg. per square centimeter.

After evacuation of hydrogen and filtration of the catalyst, the solvent is evaporated under reduced pressure. The residue is taken up with a small volume of normal hydrochloric acid and, after addition of ethanol, there is obtained the hydrochloride of N-methylated neomycin which is filtered and dried.

The obtained N-methylated neomycin hydrochloride is devoid of the antibiotic activity of the starting neomycin against *Escherichia coli* and *Micrococcus pyogenes* var. *aureus* (ATCC 6538P).

Example 6

Water (50 ml.) is poured into an hydrogenation vessel and 3.6 g. of commercial neomycin—i.e. a mixture of neomycin B and some neomycin C—is dissolved therein. The pH of the solution is brought between 3 and 4 by addition of sulfuric acid (2 N). Platinum oxide (200 mg.) and 20 ml. of 30% formaldehyde solution are added thereto and the medium is shaken for 3 hours under hydrogen pressure of 3 kg. per square centimeter.

After that reaction time, the residual hydrogen is evacuated and the catalyst is filtered. The solvent is evaporated under reduced pressure and the residue is covered with absolute alcohol. After triturating, a suspension is obtained and the precipitate is then filtered and dried. The isolated N-methylated neomycin sulfate is devoid of the antibiotic activity of the starting neomycin sulfate against *Escherichia coli* and *Micrococcus pyogenes* var. *aureus* (ATCC 6538P).

Example 7

Water (150 ml.) is poured into an hydrogenation vessel and 21.6 g. of commercial neomycin sulfate—i.e. a mixture of neomycin B and some neomycin C, $[\alpha]_D^{23} = +55°(\pm 1)$ (c.=1 in water)—is dissolved therein. Platinum oxide (600 mg.) and 60 ml. of 30% formaldehyde solution are added thereto and the medium is shaken for 4½ hours under hydrogen pressure of 3 kg. per square centimeter. After that reaction time, the residual hydrogen is eliminated and the catalyst is removed by filtration. Platinum oxide (600 mg.) is again added and the medium is shaken for 6 hours under hydrogen pressure of 3 kg. per square centimeter. The residual hydrogen is then eliminated, the catalyst is removed by filtration and the solvent is evaporated under reduced pressure.

The residue is covered with absolute ethanol. After triturating, a suspension is obtained and the precipitate is filtered, washed well with methanol and dried to yield 24.1 g. of N-methylated neomycin sulfate, $[\alpha]_D^{23} = +44°$ $(\pm 1)$ (c.=1 in water). This product is devoid of the antibiotic activity of the starting material as was the product obtained in Example 6.

The obtained product is dissolved in 1 l. of water (carbon dioxide-free) and the solution is poured onto a column of 200 ml. of Dowex 2-X8 resin. Elution is carried out with 1 l. of water. The eluate is evaporated to dryness and the residue is taken up with absolute ethanol which is thereafter evaporated. The residue is taken up in hot acetone and, by cooling, N-methylated neomycin, $[\alpha]_D^{23} = +68°(\pm 1)$ (c.=1 in water), is obtained. This product is devoid of the antibiotic activity of the starting neomycin sulfate against *Escherichia coli* and *Micrococcus pyogenes* var. *aureus* (ATCC 6538P).

When N-methylated neomycin is examined by ascending paper chromatography on Schleicher & Schüll No. 2043 (paper washed with acid) in the system n-propanol/acetic acid/pyridine/water 9:1:1:10 followed by detection with ninhydrin, a blue-grey spot with $R_f=0.51$ ($\pm 0.03$) is obtained. Under the same conditions, the starting neomycin (base) gives a violet-brown spot with $R_f=0.35$ ($\pm 0.03$).

Example 8

Water (150 ml.) is poured into an hydrogenation vessel and 10.8 g. of commercial neomycin sulfate—i.e. a mixture of neomycin B and some neomycin C—is dissolved therein. There is then added to this solution 30 ml. of 35% formaldehyde solution and 4 g. of 10% palladium-on-charcoal. The medium is shaken for 2 hours under hydrogen pressure of 2 kg. per square centimeter. After that reaction time, the residual hydrogen is eliminated, the catalyst is removed by filtration and the solvent is evaporated under reduced pressure.

The residue is covered with absolute ethanol. After triturating, a suspension is obtained and the precipitate is filtered, washed well with methanol and dried to yield 10 g. of N-methylated neomycin sulfate devoid of the antibiotic activity of the starting neomycin sulfate against *Escherichia coli* and *Micrococcus pyogenes* var. *aureus* (ATCC 6538P).

Example 9

Water (180 ml.) and 23 g. of 35% formaldehyde solution are poured into an hydrogenation vessel and 10 g. of commercial kanamycin sulfate is dissolved in the mixture. Platinum oxide (600 mg.) is then added and the medium is shaken for 4 hours under hydrogen pressure of 3 kg. per square centimeter. After that reaction time, the residual hydrogen is eliminated and the catalyst is removed by filtration. Platinum oxide (600 mg.) is again added and the medium is shaken overnight under hydrogen pressure of 3 kg. per square centimeter. The residual hydrogen is then eliminated, the catalyst is removed by filtration and the solvent is evaporated under reduced pressure.

The residue is covered with absolute ethanol. After triturating, a suspension is obtained and the precipitate is filtered and dried to yield N-methylated kanamycin sulfate. This product is devoid of the antibiotic activity of the starting kanamycin sulfate against *Escherichia coli* and *Micrococcus pyogenes* var. *aureus* (ATCC 6538P).

The obtained product is dissolved in 400 ml. of water (carbon dioxide-free) and the solution is poured onto a column of 120 ml. of Dowex 2-X8 resin. Elution is carried out with 500 ml. of water. The eluate is evaporated to dryness and the residue is taken up with absolute ethanol which is thereafter evaporated. The residue is taken up in hot acetone and N-methylated kanamycin is obtained by cooling.

When N-methylated kanamycin is examined by ascending paper chromatography on Schleicher & Schüll No. 2043 (paper washed with acid) in the system n-propanol/acetic acid/pyridine/water 9:1:1:10 followed by detection with ninhydrin, a spot with $R_f=0.48$ ($\pm 0.03$) is obtained. Under the same conditions with the starting kanamycin (base) a spot with $R_f=0.42$ ($\pm 0.03$) is obtained.

Example 10

Following the method described in Example 7 but employing 21.6 g. of paromomycin sulfate instead of 21.6 g. of neomycin sulfate therein specified, there is obtained the N-methylated paromomycin sulfate and N-methylated paromomycin free base. Both these products are devoid of the antibiotic activity of the starting paromomycin sulfate against *Escherichia coli* and *Micrococcus pyogenes* var. *aureus* (ATCC 6538P).

Example 11

A solution of 1.61 g. of neamine in 25 ml. of water is poured into an hydrogenation vessel. There is then added thereto 2.6 g. of acetaldehyde and 400 mg. of platinum oxide. The mixture is shaken for 3 hours under hydrogen pressure of 3 kg. per square centimeter.

After that reaction time, the residual hydrogen is evacuated and the catalyst is filtered. The filtrate is adjusted to pH 2.5 with N-hydrochloric acid and the solvent is evaporated to dryness. The residue is taken up with a small volume of absolute ethanol, the medium is filtered and ether is added thereto. In this way, there is obtained a precipitate which is filtered and dried to yield 2.620 g. of N-ethylated neamine hydrochloride. This product is devoid of the antibiotic activity of the starting neamine against *Escherichia coli* and *Micrococcus pyogenes* var. *aureus* (ATCC 6538P).

When N-ethylated neamine hydrochloride and the starting neamine (hydrochloride) are examined by ascending paper chromatography on Schleicher & Schüll No. 2043 (paper washed with acid) in the system n-propanol/acetic acid/pyridine/water 9:1:1:10, followed by detection with ninhydrin, the $R_f$ values and the colors of the spots are different.

Example 12

Neamine (6.44 g.) and isobutyraldehyde (5.9 g.) are dissolved in 20 ml. of ethanol and 500 mg. of platinum oxide is added to the solution. The mixture is shaken for 3 hours under hydrogen pressure of 3 kg. per square centimeter.

After that reaction time, the residual hydrogen is evacuated and the catalyst is filtered. The filtrate is adjusted to pH 2.5 with N hydrochloric acid and the solvent is evaporated to dryness. The residue is taken up with a small volume of absolute ethanol. In this way, there is obtained a precipitate which is filtered and dried to yield N-isobutylated neamine hydrochloride.

Against *Escherichia coli* and *Micrococcus pyogenes* var. *aureus* (ATCC 6538P), the antibiotic activity of N-isobutylated neamine hydrochloride is inferior to that of the starting neamine.

When N-isobutylated neamine hydrochloride and the starting neamine (hydrochloride) are examined by ascending paper chromatography on Schleicher & Shüll No. 2043 (paper washed with acid) in the system n-propanol/acetic acid/pyridine/water 9:1:1:10 followed by detection with ninhydrin, the $R_f$ values and the colors of the spots are different.

Example 13

The following derivatives are prepared by reductive alkylation of neomycin with the named aldehydes in accordance with the above procedures. The corresponding derivatives of the other basic antibiotics may obviously be prepared in the same way.

| Aldehyde | Neomycin derivative | $R_f$* |
|---|---|---|
| Glycoaldehyde | N-2-hydroxyethyl | 0.79±0.03 |
| Methoxyacetaldehyde | N-2-methoxyethyl | 0.75±0.05 |
| α-Ethoxypropionaldehyde | N-2-ethoxypropyl | 0.81±0.04 |
| Monomethylaminoacetaldehyde | N-2-monomethylaminoethyl | 0.76±0.04 |
| Dimethylaminoacetaldehyde | N-2-dimethylaminoethyl | 0.78±0.05 |
| Methylethylaminoacetaldehyde | N-2-methylethylaminoethyl | 0.80±0.03 |
| Benzaldehyde | N-benzyl | 0.89±0.05 |
| Phenylacetaldehyde | N-2-phenylethyl | 0.91±0.05 |
| Phenoxyacetaldehyde | N-2-phenoxyethyl | 0.88±0.04 |
| o-Methoxybenzaldehyde | N-o-methoxybenzyl | 0.91±0.05 |
| p-Trifluoromethylbenzaldehyde | N-p-trifluoromethylbenzyl | 0.90±0.04 |
| p-Aminobenzaldehyde | N-p-aminobenzyl | 0.84±0.03 |
| p-Methylaminobenzaldehyde | N-p-methylaminobenzyl | 0.85±0.03 |
| p-Dimethylaminobenzaldehyde | N-p-dimethylaminobenzyl | 0.87±0.05 |

*Cellulose powder thin layer chromatography in the system n-propanol/acetic acid/pyridine/water (9:1:1:10), detection with ninhydrin.

The antibiotic activity of each of these neomycin derivatives is inferior to 5% of the antibiotic activity of the starting neomycin against *Escherichia coli* and *Micrococcus pyogenes* var. *aureus* (ATCC 6538P).

Example 14

Neomycin B (13 g.) is dissolved in 23 g. of formic acid (98–100%) and 8.3 g. of paraformaldehyde is added to the solution. Under stirring, the medium is refluxed for 2¼ hours. After that time, the medium is cooled to room temperature and 200 ml. of water are added thereto. The solution is poured onto a column of 400 ml. of Dowex 2–X8 resin (OH⁻ form) and the eluate is collected. The resin bed is washed with 3 l. of water which is then added to the eluate and the collected fractions are evaporated to dryness under reduced pressure.

The residue is taken up with 35 ml. of absolute ethanol and 1.3 l. of dry ether is slowly added thereto. After standing for about five hours, the precipitate is filtered and the filtrate is evaporated under reduced pressure. The residue is triturated with petroleum ether (eb. 40–60° C.) which is then discarded by filtration. After drying, dodeca-N-methyl neomycin B is obtained, dec. 140–145° C. $[\alpha]_D^{23} = +61°$ (c.=1 in $H_2SO_4$ N/10).

A second fraction of dodeca N-methyl neomycin B can be recovered from the precipitate obtained after the five hours standing by dissolving said precipitate in 15 ml. of absolute methanol and subsequent precipitation with dry ether.

Example 15

Dodeca-N-methyl neomycin B (1.175 g.) obtained in Example 14 is dissolved in 25 ml. of absolute ethanol and 9.1 g. of benzylchloride is added thereto. The solution is refluxed for 5 hours. After that reaction time, the residue is taken up with 30 ml. of water and the aqueous solution is extracted with 3 successive portions of 15 ml. of ether in order to eliminate the unreacted benzylchloride.

The aqueous solution is then evaporated to dryness under reduced pressure and the residue is dissolved in 30 ml. of absolute ethanol. By addition of ether, a precipitate is obtained. After filtration and drying, 1.5 g. of dodeca-N-methylneomycin B polybenzochloride is obtained, dec. 168–172° C. $[\alpha]_D^{23} = 36°$ C. (c.=1 in water).

When dodeca-N-methyl neomycin B polybenzochloride is examined by ascending paper chromatography on Schleicher & Schüll No. 2043 (paper washed with acid) in the system n-propanol/acetic acid/pyridine/water 9:1:1:10 followed by detection with Dragendorff reagent, an orange-yellow spot with $R_f = 0.87$ (±0.02) is obtained.

Example 16

Dodeca-N-methyl neomycin B (9.8 g.) obtained in Example 14 is dissolved in a mixture of 200 ml. of absolute ethanol and 600 ml. of acetonitrile and 85 g. of methyliodide is added thereto at room temperature.

The medium is allowed to stand for 3 days at room temperature and then concentrated under reduced pressure up to one fourth of its initial volume. The precipitate which formed during concentration is filtered, washed with methylene chloride and dried to yield 13.2 g. of dodeca-N-methyl neomycin polymethiodide.

This product is dissolved in 200 ml. of water and the solution is passed through a column (diameter 1.5 cm.) containing 50 ml. of Dowex 1–X2 (Cl⁻ form). The resin bed is washed with 200 ml. of water and the collected effluents are evaporated up to getting an heavy syrup.

Said syrup is dissolved in 100 ml. of absolute ethanol which is then evaporated. The residue is covered with dry ether. After triturating, a suspension is obtained. The precipitate is filtered and dried to yield 8.9 g. of dodeca-N-methyl neomycin B polymethochloride, dec. 222°–225° C. $[\alpha]_D^{23} = +44°$ (c.=1 in water).

Example 17

Following the technique described in Example 14 but employing 13 g. of commercial neomycin instead of the 13 g. of neomycin B therein specified, there is obtained the dodeca N-methyl neomycin.

Example 18

Following the technique described in Example 15 but employing 1.175 g. of dodeca-N-methyl neomycin instead of the 1.175 g. of N-methyl neomycin B therein specified, there is obtained the dodeca-N-methyl neomycin polybenzochloride.

Example 19

Following the technique described in Example 16, but employing 9.8 g. of dodeca-N-methyl neomycin instead of the 9.8 g. of dodeca-N-methyl neomycin B therein specified, there is obtained the dodeca-N-methyl neomycin polymethiodide and dodeca N-methyl neomycin polymethochloride.

Example 20

Acetone (150 ml.) and water (125 ml.) are poured into an hydrogenation vessel and 18 g. of commercial neomycin (base) is dissolved in the mixture. There is then added 10 g. of 5% palladium on aluminium oxide and the mixture is shaken for 36 hours under hydrogen pressure of 4 kg. per square centimeter.

After evacuation of residual hydrogen and filtration of the catalyst, the solution is concentrated under reduced pressure up to a final volume of 100 ml.

By slow addition of sulfuric acid (5 N) under stirring, the pH of the concentrated solution is brought to 6. The yellowish solution is discoloured by a 15 minute contact at room temperature with charcoal and then concentrated up to 50 ml.

The concentrated solution is poured with stirring into 500 ml. of methanol. The obtained precipitate is filtered and washed with methanol and then with ether. After drying, 26.4 g. of N-isopropylated neomycin sulfate is obtained.

When N-isopropylated neomycin is examined by ascending paper chromatography on Schleicher & Schüll No. 2043 (paper washed with acid) in the system n-propanol/acetic acid/pyridine/water (9:1:1:10) followed by detection with ninhydrin, a spot with $R_f=0.60$ ($\pm 0.05$) is obtained.

This N-isopropylated neomycin is devoid of the antibiotic activity of the starting material against *Escherichia coli* and *Micrococcus pyogenes* var. *aureus* (ATCC 6538P).

Example 21

Acetic acid (200 ml.) is poured into an hydrogenation vessel and 12 g. of hexa-N-benzyl neomycin B is dissolved therein. There is then added 7.8 ml. of 30% formaldehyde solution and 700 mg. of platinum oxide. The mixture is shaken overnight under hydrogen pressure of 3 kg. per square centimeter.

After that reaction time, the residual hydrogen is eliminated and the catalyst is removed by filtration. Platinum oxide (500 mg.) is added and the mixture is shaken for 6 hours under hydrogen pressure of 3 kg. per square centimeter. The residual hydrogen is then eliminated, the catalyst is removed by filtration and the solvent is evaporated under reduced pressure. The residue is taken up with 150 ml. of water and filtered. The pH of the medium is adjusted to 11 with potassium hydroxide (N).

The precipitate is filtered, washed with water and dried to yield hexa-N,N',N'',N''',N'''',N'''''-benzyl-, hexa-N,N',N'',N''',N'''',N'''''-methyl neomycin base, M.P. 115–120° C.

When the obtained product is examined by thin layer plate chromatography on silica gel G developed with a mixture methyl ethyl ketone/acetone/water/formic acid, 80:4:12:2, followed by detection with ninhydrin, a spot with $R_f=$ about 0.08 is obtained.

The above employed hexa-N-benzyl neomycin B is prepared as follows:

Neomycin B sulfate (20 g.) is dissolved in 200 ml. of water and the pH of the solution is adjusted to 12 with normal potassium hydroxide. Freshly distilled benzaldehyde (16 g.) is added and the mixture is stirred for 24 hours. The precipitated benzylidene derivative is filtered, washed with water and dried.

A 7.6 g. aliquot of said benzylidene derivative is dissolved in 100 ml. of methanol, 800 mg. of platinum oxide is added and the medium is shaken overnight under hydrogen pressure of 3 kg. per square centimeter. After that reaction time, the residual hydrogen is eliminated, the catalyst is removed by filtration and the solvent is evaporated under reduced pressure.

The residue is covered with petroleum ether (eb. 40–60° C.). After triturating, a suspension is obtained and the precipitate is filtered and dried to yield 7 g. of crude hexa-N-benzyl neomycin base.

A 3 g. aliquot of this crude product is dissolved in 20 ml. of acetone and poured onto a column (diameter 2.8 cm.) filled with 75 g. of silica gel (Merck, 0.05–0.2 mm.). Development is performed with a mixture methyl ethyl ketone/acetone/water/formic acid, 80:4:12:2, and the effluent is collected in 10 ml. portions. The fractions containing the main component are detected by analytical testing using the thin layer chromatography method and then combined.

After addition of 100 ml. of water, the methyl ethyl ketone is evaporated under reduced pressure.

The residual aqueous solution is extracted with 3 portions of 100 ml. of chloroform, the pH being adjusted to 12. The combined chloroformic extracts are dried over anhydrous sodium sulfate and the solvent is then evaporated under reduced pressure. The residue is covered with petroleum ether (eb. 40–60° C.). After trituration, a suspension is obtained. The precipitate is filtered and dried to yield 1.680 g. of hexa-N-benzyl neomycin B (dec. 90–95° C.).

When the product is examined by thin layer plate chromatography on silica gel G developed with a mixture methyl ethyl ketone/acetone/water/formic acid, 80:4:12:2, followed by detection with ninhydrin, a spot with $R_f=$ about 0.12 is obtained.

Example 22

Following the technique described in Example 21 but starting from commercial neomycin sulfate instead of neomycin B sulfate, there is obtained hexa-N,N',N'',N''',N'''',N''''' - benzyl-N,N',N'',N''',N'''',N'''''-methyl neomycin base.

Example 23

Commercial neomycin base (3.08 g.) and 2.9 g. of freshly distilled benzaldehyde are dissolved in 50 ml. of methanol and the mixture is refluxed for 2 hours. After cooling up to room temperature, the medium is poured into an hydrogenation vessel and 600 mg. of platinum oxide is added.

The medium is shaken overnight under hydrogen pressure of 3 kg. per square centimeter. The residual hydrogen is then eliminated, the catalyst is removed by filtration and the solvent is evaporated under reduced pressure.

The oily residue is covered with petroleum ether (eb. 40–60° C.). After triturating, a suspension is obtained. The precipitate is filtered and dried to yield N-benzylated neomycin.

The free base is dissolved in 100 ml. of ethyl acetate and 300 ml. of water is added with stirring. The pH of the medium is brought to 3.8 by slow addition of sulfuric acid with stirring.

The aqueous phase is separated and evaporated. The residue is covered with acetone. After triturating, a suspension is obtained. The precipitate is filtered and dried to yield N-benzylated neomycin sulfate.

*Example 24*

Following the technique described in Example 23 but employing 3.08 g. of neomycin B instead of the 3.08 g. of commercial neomycin therein specified, there is obtained the N-benzylated neomycin B and N-benzylated neomycin B sulfate.

*Example 25*

N-methylated kanamycin base (5 g.) obtained as described is Example 9 is dissolved in hot ethanol from which octa N-methyl kanamycin base crystallizes on cooling, $[\alpha]_D = 121°$ (c.=1 in 0.1 N $H_2SO_4$), M.P. 208–210° C. A 1.9 aliquot of octa-N-methyl kanamycin base is dissolved in 70 ml. of absolute methanol.

Acetonitrile (430 ml.) and methyliodide (14.6 g.) are then added to the solution. The medium is allowed to stand at room temperature for one week and another 14.6 g. portion of methyliodide is then added thereto.

After another one week standing at room temperature, the solution is concentrated under reduced pressure to a final volume of 125 ml. The precipitate is filtered and washed with methylene chloride to yield 3.5 g. of octa-N-methyl kanamycin tetramethiodide, dec. 214° C.

*Example 26*

Dry methanol (200 ml.) is poured into an hydrogenation vessel and 8.6 g. of tetrabenzylidene kanamycin is dissolved therein. Platinum oxide (800 mg.) is then added and the medium is shaken for 15 hours under hydrogen pressure of 2 kg. per square centimeter. After that reaction time, the residual hydrogen is eliminated, the catalyst is removed by filtration and the solvent is evaporated under reduced pressure.

The residue is covered and triturated with absolute ethanol. After recrystallization from a mixture absolute methanol/ethanol (4:1), tetra-N-benzyl kanamycin base is obtained, M.P. 197.5–198.5, $[\alpha]_D = +84°$ (c.=1, 1% in $H_2SO_4$ N/10).

The hereabove employed tetrabenzylidene kanamycin is obtained as follows:

Commercial kanamycin sulfate (20 g.) is dissolved in 100 ml. of water and the pH of the solution is adjusted to 12 with 2 N sodium hydroxide solution. Benzaldehyde (17 ml.) is then added dropwise under vigorous stirring which is maintained for 18 hours after complete addition of the reagent. In this way, there is obtained an oil solidifying on standing.

The medium is filtered and the precipitate is dried to yield tetrabenzylidene kanamycin, dec. 240° C.

*Example 27*

Tetra-N-benzyl kanamycin base (19.3 g.) obtained according to the technique described in Example 26 is slowly added to a mixture of 25.6 ml. of formic acid (99–100%) and 2.4 ml. of water.

There is added 23.5 ml. of a 35% formaldehyde solution and the mixture is refluxed for 15 hours.

The medium is evaporated under reduced pressure up to getting a gel. The residue is taken up with 10 ml. of N hydrochloric acid which is thereafter evaporated. The residue is then dissolved in water. By addition of a 2 N hydroxide solution up to getting a pH value of about 9, a precipitate is obtained which is extracted with chloroform, the organic extract being then dried over anhydrous sodium sulfate and evaporated to dryness under reduced pressure.

The residue is covered and triturated with petroleum ether (eb. 40–60° C.).

After filtration and drying, tetra-N, N′, N″, N‴-benzyl, tetra-N, N′, N″, N‴-methyl kanamycin is obtained, M.P. 118–120° C.

It will be apparent that the number of N-lower alkyl groups substituted on the amine groups of the amino sugar nucleus of the parent antibiotic can run from the minimal number in which the antibacterial activity of the parent is destroyed, such as 2, up to exhaustive N-alkylation.

Often the new compound of this invention is used as described as a mixture of compounds having various degrees of N-substitution for the best practical results but still having no antibiotic but substantial hypocholesterolemic activity.

This is the connotation of the term "poly-N-alkyl" as used herein. The term "lower alkyl" refers to group, straight or branched, having from 1–5 carbon atoms. Most conveniently, the N-alkyl group will be uniform, however, certain mixed groups can also be present as described hereabove.

What is claimed is:

1. Poly-N-lower alkyl derivatives of the antibiotics, neomycin, kanamycin or paromomycin, having hypocholesterolemic activity, the nontoxic salts of said derivatives with pharmaceutically acceptable acids or the pharmaceutically acceptable quaternary salts of said derivatives with lower alkyl chloride, bromide or iodides, the said poly-N-lower alkyl groups of said derivatives: (1) being (a) lower alkyl of 1–5 carbon atoms; (b) (hydroxyphenyl)-lower alkyl, (alkoxyphenyl)-lower alkyl, (trifluoromethylphenyl)-lower alkyl, (aminophenyl)-lower alkyl, (alkylaminophenyl)-lower alkyl, (dialkylaminophenyl)-lower alkyl or phenyllower alkyl said alkoxy and alkyl groups having 1–5 carbon atoms and said lower alkyl groups having from 1 to 5 carbon atoms; or (c) hydroxylower alkyl, alkoxylower alkyl, phenoxylower alkyl, aminolower alkyl, (alkylamino)-lower alkyl or (dialkylamino)-lower alkyl, said alkoxy or alkyl groups having 1–5 carbon atoms and said lower alkyl groups having 2–5 carbon atoms; (2) being substituted on at least two of the amine functions of the amino sugar nucleus of the parent antibiotic; and (3) being sufficient in number to destroy any useful antibiotic activity of the parent antibiotic compound.

2. The compound of claim 1 in which the lower alkyl group is methyl and the antibiotic is neomycin.

3. The compound of claim 1 in which the compound is N-octamethylneamine.

4. The compound of claim 1 in which the compound is poly-N-methylneomycin sulfate.

5. The compound of claim 1 in which the compound is dodeca-N-methyl neomycin B.

6. The compound of claim 1 in which the compound is hexa-N-benzylhexa-N-methyl neomycin.

7. The compound of claim 1 in which the lower alkyl group is methyl and the antibiotic is kanamycin.

References Cited

UNITED STATES PATENTS 3,277,078  10/1966  Horii et al. ---------- 260—210
3,296,246   1/1967  Ores et al. ---------- 260—210

LEWIS GOTTS, *Primary Examiner.*

J. BROWN, *Assistant Examiner.*